US011028586B2

(12) United States Patent
Iellimo

(10) Patent No.: US 11,028,586 B2
(45) Date of Patent: Jun. 8, 2021

(54) STRUCTURAL MEMBER CONNECTION SYSTEM

(71) Applicant: FRAZIER INDUSTRIAL COMPANY, Long Valley, NY (US)

(72) Inventor: Domenick Iellimo, Forked River, NJ (US)

(73) Assignee: FRAZIER INDUSTRIAL COMPANY, Long Valley, NJ (US)

( * ) Notice: Subject to any disclaimer, the term of this patent is extended or adjusted under 35 U.S.C. 154(b) by 0 days.

(21) Appl. No.: 16/580,190

(22) Filed: Sep. 24, 2019

(65) Prior Publication Data

US 2020/0063435 A1  Feb. 27, 2020

Related U.S. Application Data

(63) Continuation-in-part of application No. 16/517,854, filed on Jul. 22, 2019, now Pat. No. 10,689,852, which is a continuation of application No. 15/945,243, filed on Apr. 4, 2018, now Pat. No. 10,400,454.

(51) Int. Cl.
*E04C 3/04* (2006.01)
*A47B 47/02* (2006.01)

(52) U.S. Cl.
CPC .............. *E04C 3/04* (2013.01); *A47B 47/027* (2013.01); *E04C 2003/046* (2013.01)

(58) Field of Classification Search
CPC ........ E04C 3/04; E04C 2003/046; E04C 3/07; E04C 2003/0473; A47B 47/027; B65G 1/02; E04B 5/10; E04B 1/24; E04B 2001/2484; E04B 2001/2448; E04B 2001/2457; E04B 2001/2415

See application file for complete search history.

(56) References Cited

U.S. PATENT DOCUMENTS

| 840,830 | A | * | 1/1907 | Dodds | .................. | B21D 35/00 |
| | | | | | | 72/324 |
| 2,384,849 | A | | 6/1943 | Pieri | | |
| 2,714,540 | A | * | 8/1955 | Diehm | .................... | A47B 3/12 |
| | | | | | | 108/155 |
| 2,996,161 | A | * | 8/1961 | Etling | ...................... | E06B 3/96 |
| | | | | | | 52/455 |
| 3,831,333 | A | * | 8/1974 | Nelsson | ................ | E04B 2/7457 |
| | | | | | | 52/241 |
| 3,867,048 | A | * | 2/1975 | Endzweig | ................ | F16B 7/18 |
| | | | | | | 403/252 |
| 4,246,737 | A | * | 1/1981 | Eiloart | .................. | B21D 47/01 |
| | | | | | | 29/897.31 |

(Continued)

*Primary Examiner* — Ko H Chan
(74) *Attorney, Agent, or Firm* — Dilworth & Barrese LLP

(57) ABSTRACT

A universal structural support member that includes multiple holes formed therethrough is provided to attach to multiple sized horizontal beams of a storage rack, built strong enough to support multiple pallets of goods. Pre-formed holes through the structural member and/or horizontal beam can be formed in the shape of a polygon, e.g., a square hole. A bolt to attach the structural support to the horizontal beam can be formed with a key structure to interlock with the hole and prevent rotation of the nut and/or structural member. The member can be configured with multiple holes in multiple arrangements to allow the structural support member to be used with differently sized storage racks.

17 Claims, 18 Drawing Sheets

(56) References Cited

U.S. PATENT DOCUMENTS

| | | | |
|---|---|---|---|
| 4,394,805 A * | 7/1983 | Napper | E06B 9/01 49/141 |
| 5,012,938 A | 5/1991 | King | |
| 5,312,004 A | 5/1994 | Krummell, Jr. | |
| 5,411,153 A | 5/1995 | Unfried | |
| 5,542,549 A * | 8/1996 | Siemon | H04Q 1/14 211/189 |
| 5,857,306 A * | 1/1999 | Pellock | E04B 1/5806 403/230 |
| 6,327,828 B1 | 12/2001 | Carroll | |
| 6,450,350 B1 * | 9/2002 | Krummell, Jr. | A47B 47/027 211/183 |
| 6,457,787 B1 * | 10/2002 | Chicoyne | F16B 12/30 312/265.1 |
| 6,813,919 B1 * | 11/2004 | Ellis | B21D 5/08 72/181 |
| 8,727,144 B2 | 5/2014 | Krummell | |
| 8,833,039 B2 | 9/2014 | Gallagher, Jr. | |
| 9,066,585 B2 | 6/2015 | Kirby | |
| 9,568,034 B2 * | 2/2017 | Gabriel | F16B 7/0446 |
| 10,047,513 B2 * | 8/2018 | Yang | F16B 7/0453 |
| 2004/0049993 A1 * | 3/2004 | Saldana | E04C 3/11 52/90.2 |
| 2006/0185312 A1 * | 8/2006 | Weeks | E04B 1/24 52/653.1 |
| 2009/0277854 A1 | 11/2009 | Eustace | |
| 2010/0254753 A1 | 10/2010 | Mulholland | |
| 2012/0047836 A1 * | 3/2012 | Sareyka | E04B 9/068 52/506.06 |
| 2018/0355646 A1 * | 12/2018 | Revelis | E05D 3/02 |

* cited by examiner

STRUCTURAL MEMBER CONNECTION SYSTEM

CROSS REFERENCE TO RELATED APPLICATIONS

This application claims priority as a continuation-in-part of application Ser. No. 16/517,854, filed Jul. 22, 2019, which itself is a Continuation of application Ser. No. 15/945,243, filed Apr. 4, 2018. The entire contents of these applications are incorporated herein by reference.

BACKGROUND

Storage systems are used in warehouses, department stores, and storage facilities. Many storage systems comprise a plurality of storage racks that often hold and support large amounts of heavy materials. Storage rack systems are commonly constructed with a plurality of vertical columns that are sturdily positioned on a base or floor. A plurality of horizontal beams are typically fastened with bolts and nuts to the vertical columns. Structural supports are then fastened to the horizontal beams to support pallets thereon. Bolting a structural support to a horizontal beam is often a two person procedure, with one person preventing the bolt from twisting and another tightening the nut over the bolt.

The horizontal beams and the platforms can include a plurality of structural features, and all of these components operate together in order to adequately support heavy amounts of material. For example, the structured supports are commonly used to support pallets loaded with goods. These loaded pallets can often weigh 1000-3000 pounds. When the structured support is fastened to the horizontal beam with a single bolt, the structural support may at times loosen or begin to rotate around the bolt, thereby hindering the ability of the storage rack to evenly and reliably support objects.

In addition, storage systems often have differently sized storage racks for different purposes. For example, some storage racks may include platforms or horizontal support beams that have a width in the vertical direction of three inches, while others are four inches, and still others are three and a half inches. These horizontal beams often have a "C" or "I" configuration. Each increasing width beam is typically able to hold more weight, but the use of rack pieces having multiple dimensions can be more costly than using single sized parts. Thus, if the storage racks that employ three-inch width horizontal support beams are sufficient for a company's purpose, then the company will not need to spend additional money on the storage rack parts that fit with the three and a half inch or four inch width horizontal support beams, because a structural member configured for one size beam may not suitable for a differently sized horizontal beam, e.g., if it is desired to provide an even support surface with all the pieces having an upper surface on the same plane.

Accordingly, it is desirable to provide an attachment system for a rack system that is quicker and easier to assemble, which requires fewer specially sized and configured parts and which is easier to assemble, as compared to the prior art.

SUMMARY OF THE INVENTION

Generally speaking, in accordance with the invention, a universal structural support member is provided. In one embodiment of the invention, the support member includes one or multiple connection holes formed therethrough. The holes can be sized to receive bolts of sufficient diameter to support the structural support. The structural support can be constructed to be attachable to multiple sized storage rack beams with differently located pre-formed holes and still have an upper surface at the plane of the upper surface of the other support parts. The pre-formed holes in the structural support and/or support beam can be formed with structures to prevent the bolt from rotating as a nut is installed thereon. The bolt itself can be formed with a key structure to interact with the lock structures on the structural support to prevent the bolt from rotating as a nut is installed thereon. One example is a polygon, e.g. a square hole in the connection portion of the structural support and a locking polygon "key" structure formed above the threaded portion of the bolt. The key structure engages the hole which acts as a lock to help prevents the bolt from rotating as the nut is twisted over the threaded portion. The key structure can also engage locking holes on the beam to which the support is attached to prevent twisting between the support and beam.

The universal structural support member can be configured to prevent the structural support member from rotating while being fastened to any of the differently sized horizontal support beams and afterwards, when the structured support member is loaded. For example, the structural support member can be configured so that if it begins to rotate with respect to the horizontal beam, then a portion of the structural member will come into contact with an upper flange or other feature of the horizontal beam, thereby preventing the structural member from rotating.

A structural support member in accordance with the invention can be constructed with a central portion defining a longitudinal axis, a first end, and a second end. The central portion can have a substantially uniform cross-sectional L-shape configuration along the longitudinal axis. The structure support member can have a top surface. A first connection component can extend as a flap-like flange, preferably extending downwards from the top surface of the first end of the structural member. The first connection component can have one or more bolt receiving holes formed therethrough. If two or more holes are present, they should be off-centered on the connection component. The holes can be polygon, e.g. square, shaped. The two ends of the structural supports can be configured to be the same.

DETAILED DESCRIPTION OF THE PREFERRED EMBODIMENTS

The present disclosure may be understood more readily by reference to the following detailed description of the disclosure taken in connection with the accompanying figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Reference will now be made in detail to the exemplary embodiments of the present disclosure, which are illustrated in the accompanying drawings.

Figure 1:
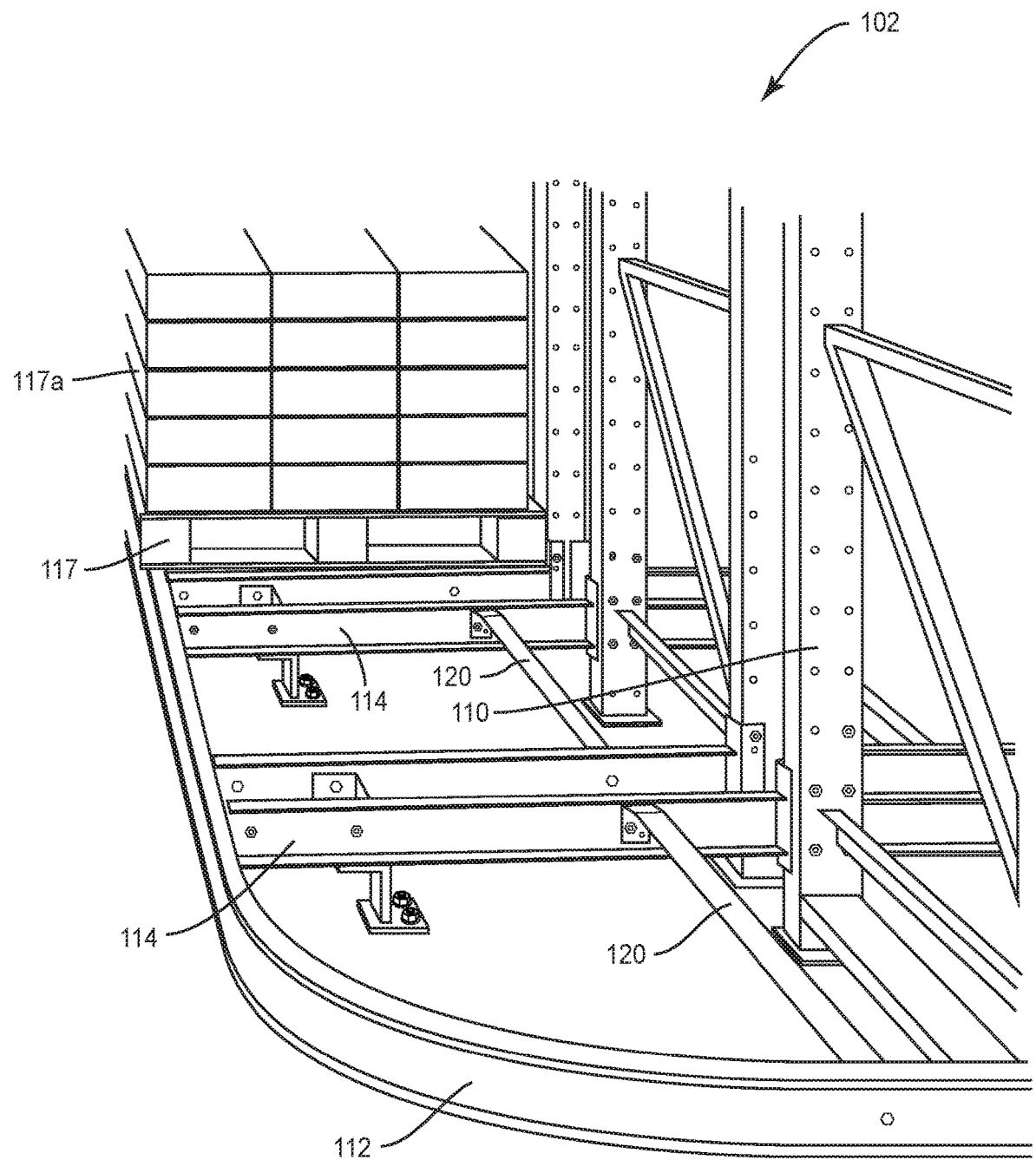
FIG. 1 is a perspective view of a storage rack in accordance with aspects of the present disclosure.

FIG. 1 illustrates an example of a fully assembled storage rack 102. A plurality of vertical columns 110 extend upward from a floor or base support surface. A plurality of horizontal beams 114 and platform supports 112 are connected to and supported by vertical columns 110. A plurality of structural support members 120 are positioned between and connected to platform 112 and horizontal beams 114 as well between pairs of horizontal beams 114.

A pallet 117 having goods 117a thereon is supported by platform 112, beam 114 and structural support 120. Storage rack 102 is intended to support multiple pallets 117. Each pallet can weight 1000-3000 pounds. The upper surfaces of platforms 112, beams 114 and structural supports 120 should all be at substantially the same vertical height and define a horizontal plane to provide an even support surface for pallets 117.

Although FIG. 1 shows horizontal beam 114, platform 112, and structural support 120 at a lower portion of vertical column 110, it should be understood that horizontal beam 114, platform 112, and structural support 120 may be positioned at any location along vertical column 110. Furthermore, although FIG. 1 depicts the present disclosure being implemented on a first level, it should be understood that the present technology may also be implemented on a second level or any number of levels as well.

FIGS. 2A-E provide exemplary views of structural support member 120. Structural support 120 includes a central portion 122 which is comprised of a first piece or top portion 124 and a second piece or side portion 126 that form central portion 122 into an L-shape with top portion 124 and side portion 126 forming the two arms of the "L".

Figure 2A:
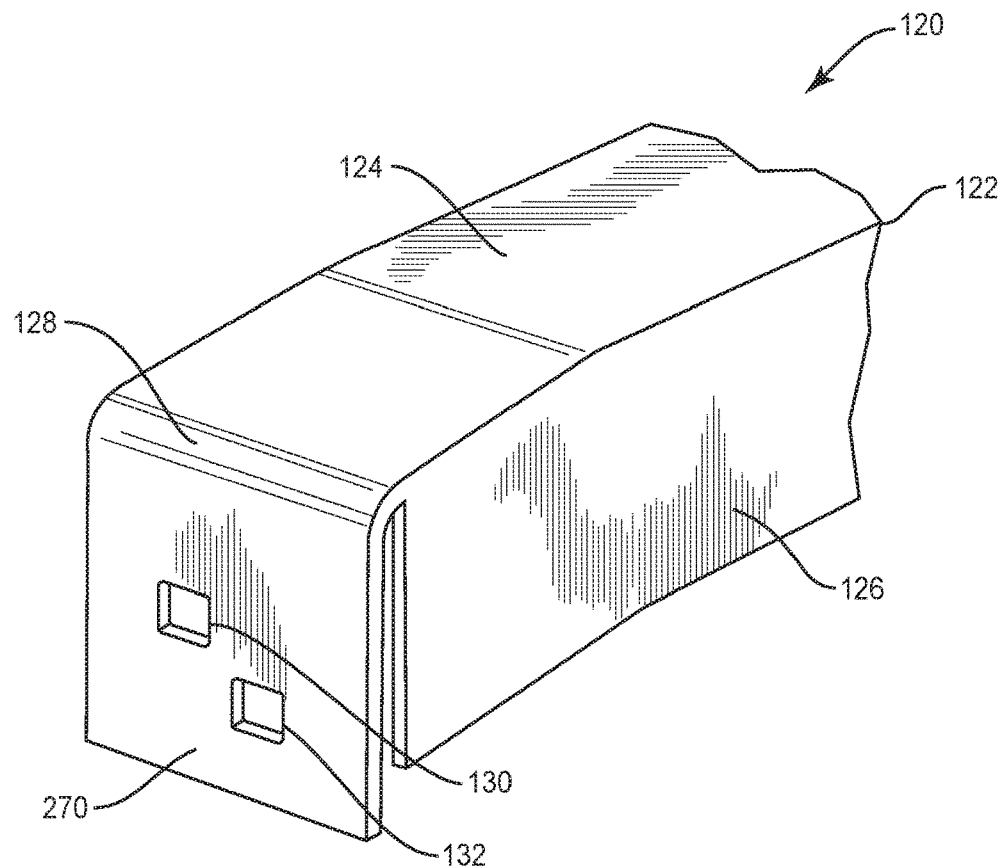
FIGS. 2A-E are perspective and side views of a first embodiment of a structural support member of the storage rack in accordance with aspects of the present disclosure.
Figure 2B:
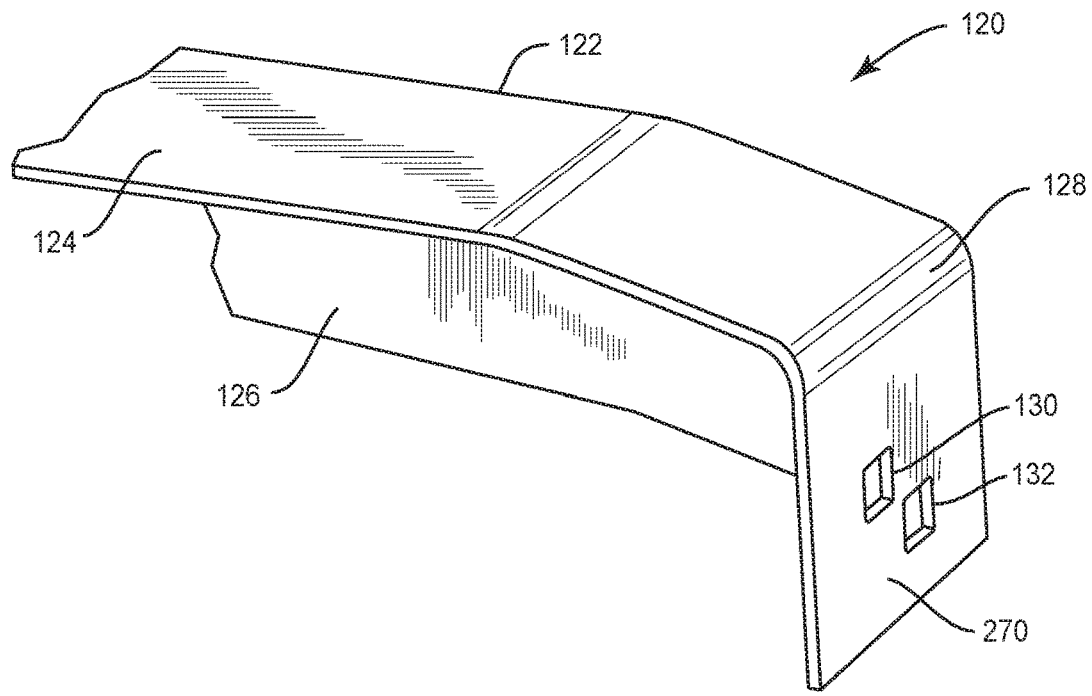
Figure 2C:
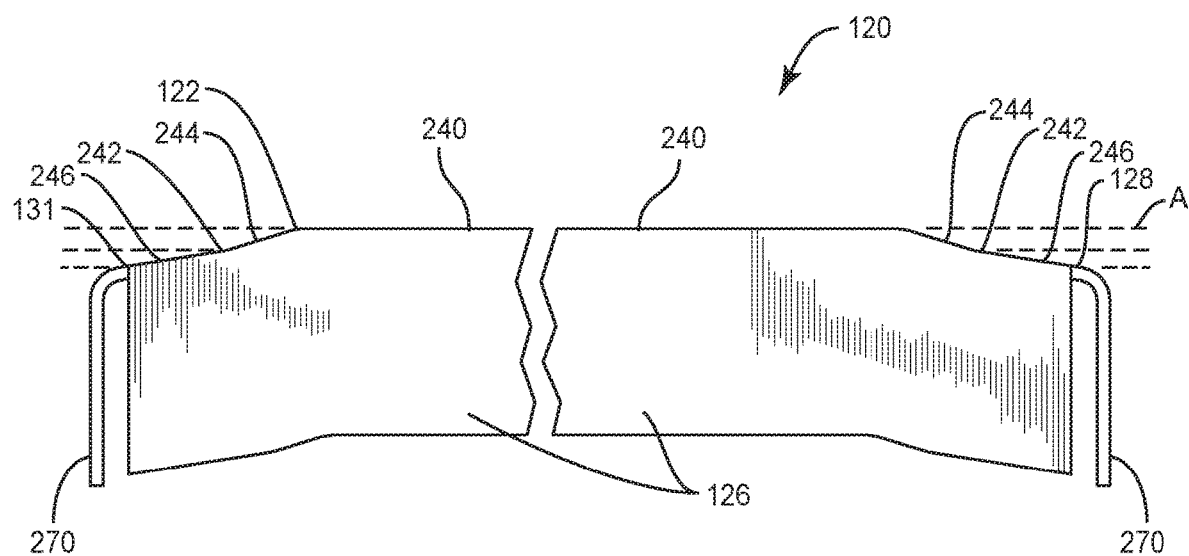
Figure 2D:
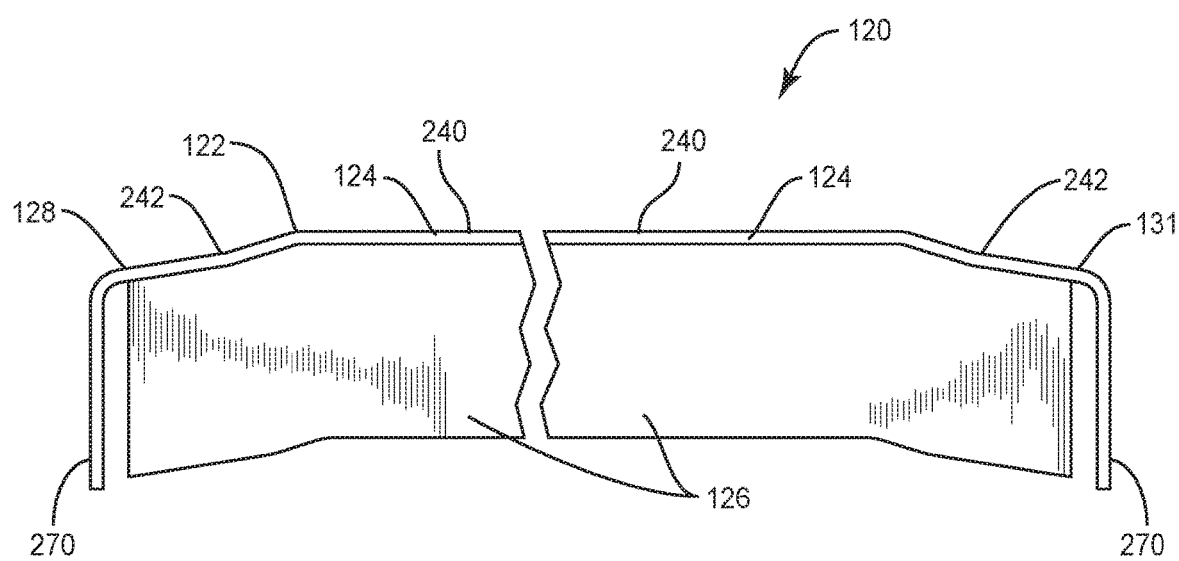
Figure 2E:
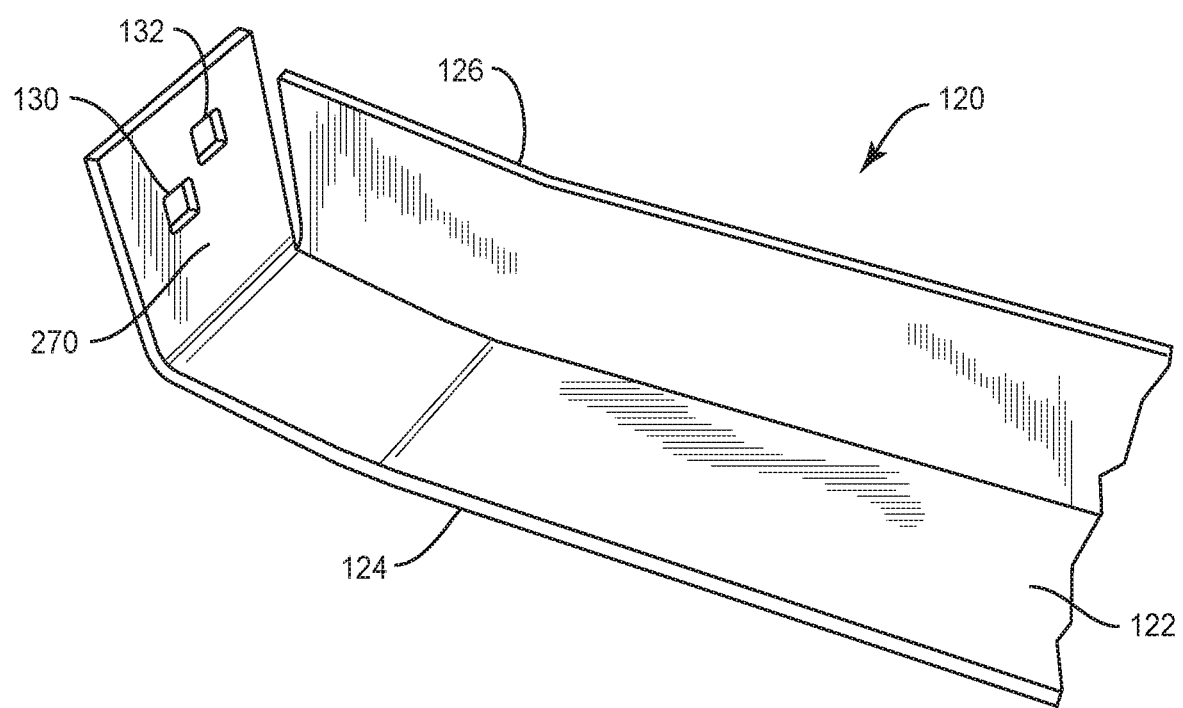

As shown in FIGS. 2C-D, first piece 124 includes a first end 128 and a second end 131, which is opposite first end 128. A first central portion 240 of first piece 124 has an upper surface that defines a first plane A. A second end portion 242 is adjacent to first end 128 and to second end 130. End portion 242 is formed with a downward slope at an acute angle with respect to first plane A, such that the top surface of end portions 242 are offset downward from first plane A. End portions 242 can be formed with multiple slopes that define multiple planes at different angles from first plane A.

Figure 9A:
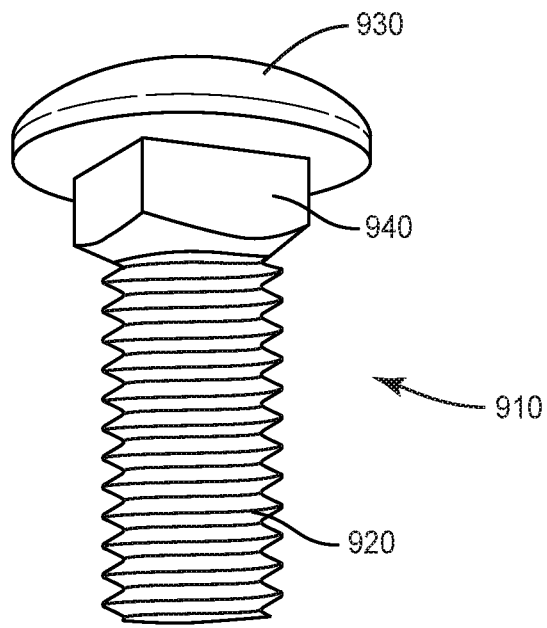
FIGS. 9A and 9B are perspective views of a keyed fastener, in accordance with aspects of the present disclosure.

Structural support member 120 includes a connection flange component 270. Connection flange 270 extends downwards from first end 128 and second end 131. Connection flange 270 is substantially perpendicular to plane A and has a plurality of bolt receiving holes, e.g., a first hole 130 and a second hole 132 formed therethrough. First and second holes 130 and 132 are square, but can preferably have any polygon shape, such as a triangle, hexagon or octagon. They can also be round. Regular polygons are preferred. The polygon shape can act as a lock structure to prevent rotation of a specially designed key bolt 910, as shown in FIG. 9A.

Key bolt 910 includes a threaded portion 920 and a head portion 930. Threaded portion 920 is inserted through bolt receiving hole 130 or 132. Head 930 has a diameter larger than holes 130 or 132. Key bolt 910 includes a key structure 940. Key structure 940 has a polygon shape preferably matching the polygon shape of holes 130 and 132. The greater the number of sides of the polygon, the easier it can be to rotate bolt 910 with respect to hole 130 or 132 to fit key structure 940 into hole 130 or 132. However, this can increase cost or complexity. The key and lock structure of bolt 910 and holes 130 and 132 helps keep bolt 910 from rotating when a nut is tightened over threaded portion 920.

Figure 9B:
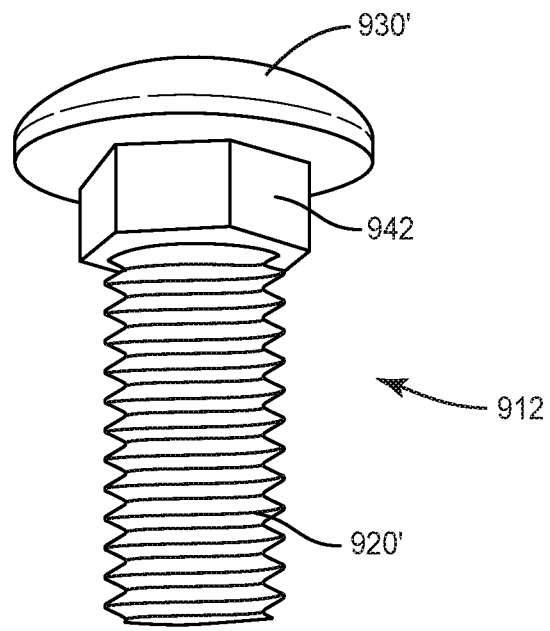

FIG. 9B shows a hex key bolt 912, which is similar to key bolt 910, but has a hexagon shaped key structure 941, rather than a square shaped key structure. Hex key bolt 912 includes a threaded portion 920' and a head portion 930'. Threaded portion 920' is inserted through a bolt receiving hole in the horizontal beam and/or connection flange with a shape interlocking with hexagon shaped key structure 941. For example, the hole in the connection flange can have substantially the same dimensions as the cross section of hexagon shaped key structure 941.

First piece 124 includes the downward slope so that connection flange 270 is able to lay flat against horizontal beam 114 to connect structural support 120 to horizontal beam 114 (or platform 112) with the top surface of central portion 240 of support 120 and the top surface of beam 114 at the same level (plane A). For example, referring to FIGS. 3A-B, horizontal beam 114 (and platform 112) is a C-beam, having an upper top flange 334, a lower bottom flange 338 and a vertical wall or web 336 extending from upper flange 334 to lower flange 338. Structural support 120 is connected to horizontal beam 114 with connection flange 270 flat against vertical wall 336. In this regard, if second portion 242 of first piece 124 did not include the downward slope, then first piece 124 could interfere with connecting structural support 120 to horizontal beam 114 by colliding with upper flange 334. Note that the horizontal beam can be an I beam, and the effect would be the same, as each side of an I beam is similar to the concave side of a C beam having a channel between upper and lower flanges.

In another embodiment of the invention, second portion 242 of structural support 120 includes two sloping portions that each form a plane inclined downward with respect to plane A at a different angle than the first plane of first portion 240. Specifically, as shown in FIG. 2C a first slope portion 244 forms a first downward inclined plane at a first angle and a second downward inclined slope portion 246 forms a second plane at a different angle, downward from plane A. First slope portion 244 and second slope portion 246 can help first piece 124 of structural support 120 to fit snugly and nest against the lower surface of upper flange 334 in the face (vertical wall 336) of horizontal beam 114, as discussed in further detail below. First slope 244 is preferably steeper, i.e., at a larger angle downward from plane A, than second slope 246. In a preferred embodiment of the invention, the angle of first slope 244 is about 15° to 20°, preferably about 17° downward from plane A and the angle of second slope 246 is about 7° to 11°, preferably about 9° downward from plane A.

As shown in FIGS. 2A-E, structural support 120 includes two holes through connection flange 270. Both ends of structural support 270 can have the same configuration. A connection flange 270 is positioned on both ends of structural support 120, i.e., first end 128 and second end 130. Connection flange 270 extends substantially perpendicular to first piece 124 (plane A). Connection flange 270 is preferably parallel to vertical wall 336. First hole 130 and second hole 132 are positioned off-centered with respect to connection flange 270. Furthermore, the two holes through connection flange 270 are employed so that structural support 120 is able to connect to differently sized horizontal beams. The connecting hole pre-formed through vertical wall 336 is typically in the center in the widthwise direction. Therefore, differently sized horizontal members will have the connection hole a different distance from the top surface thereof. Accordingly, by providing connection flange 270 with multiple holes that are different distances from the top of connection flange 270, the same structural support member can be used with differently sized horizontal members. This can help decrease costs and reduce inventory issues.

Figure 3A:
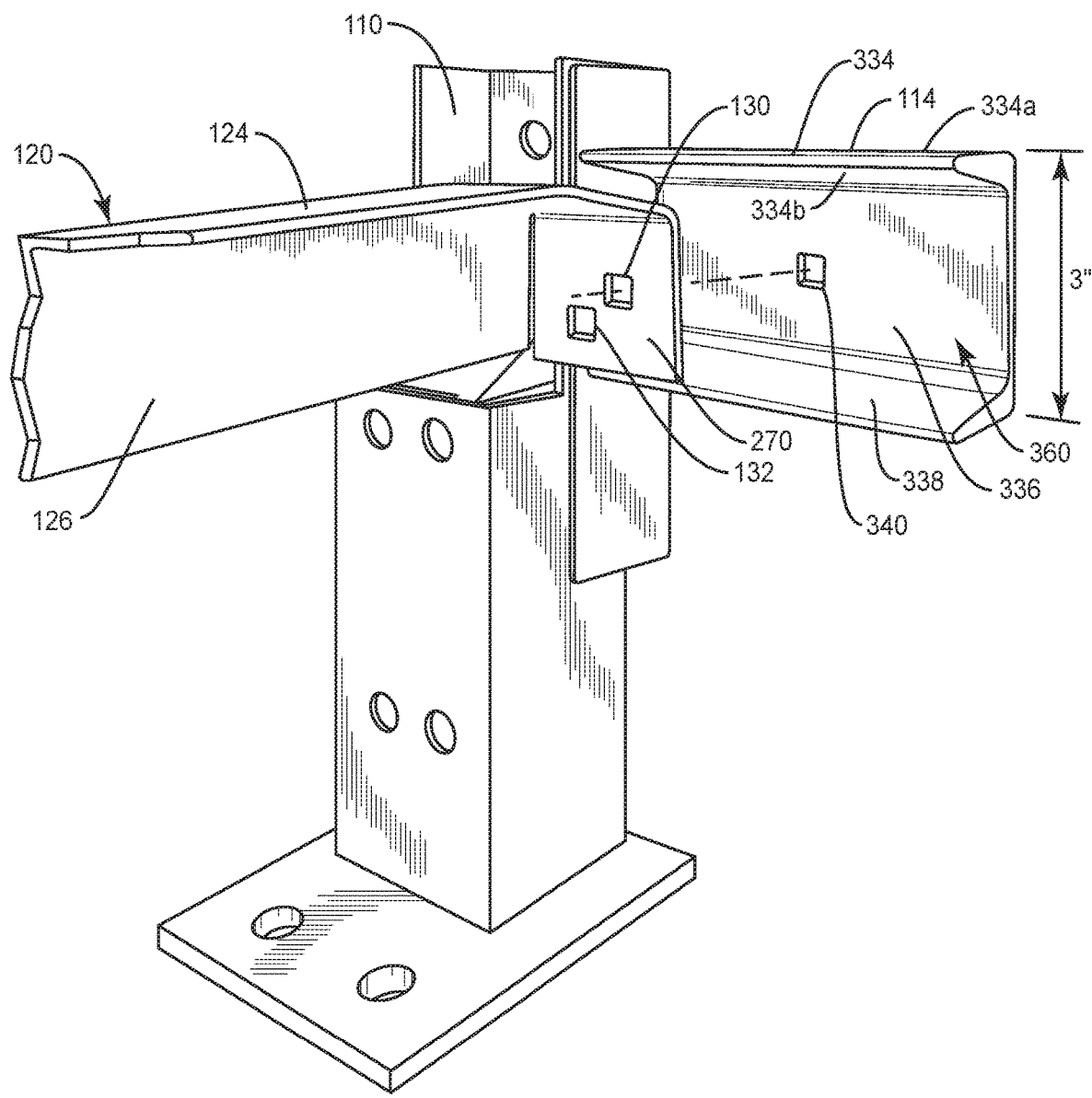
FIGS. 3A-B are perspective views of a structural support member connecting with a horizontal beam, in accordance with aspects of the disclosure.
Figure 3B:
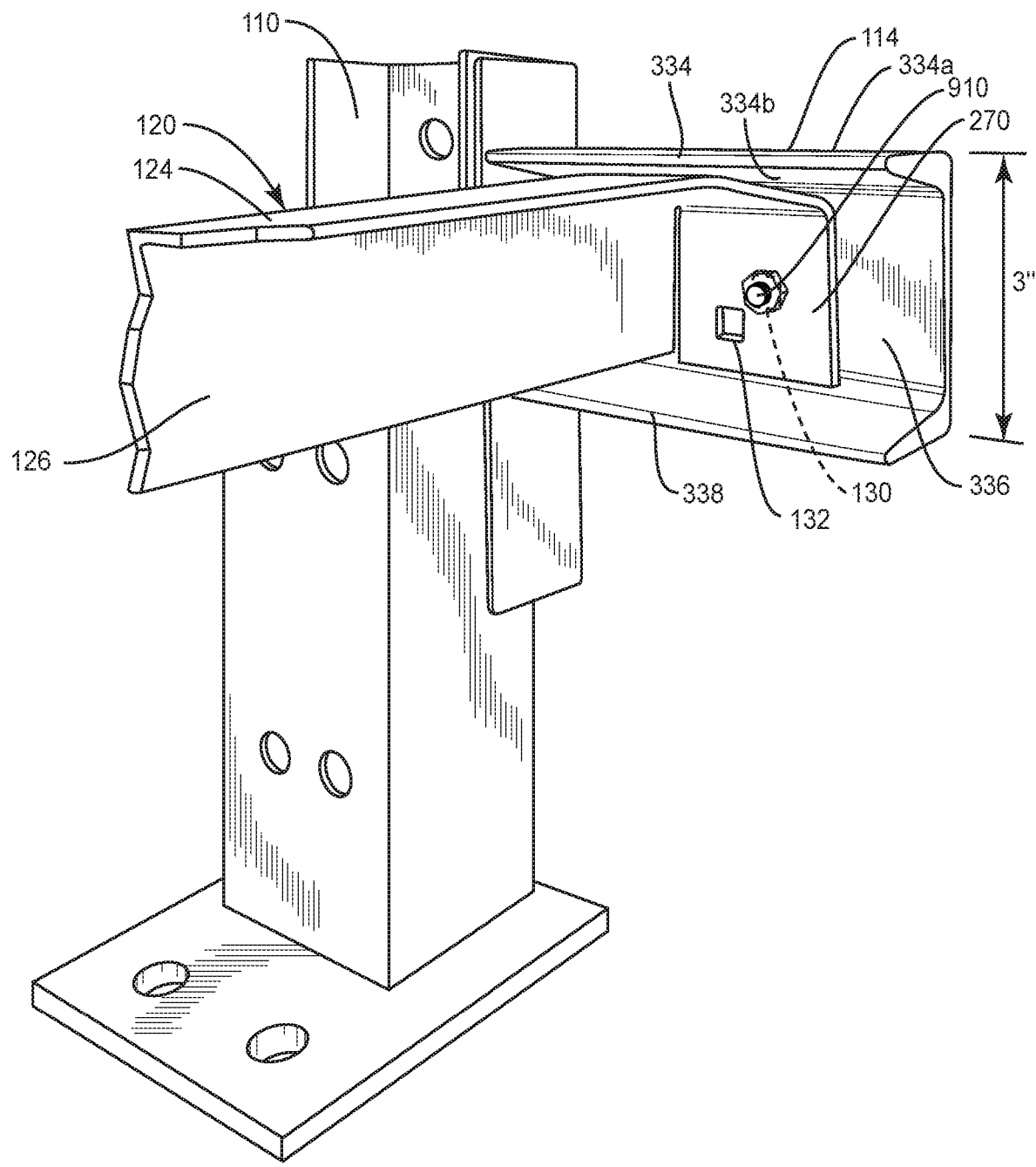

FIGS. 3A-B provide an example of structural support 120 connected to horizontal beam 114, which has a width of about three inches, measured as the length perpendicular to the longitudinal axis of horizontal beam 114. Horizontal beam 114 is defined by upper flange 334, middle vertical wall or web 336, and lower flange 338. Upper flange 334 and lower flange 338 extend substantially parallel to the plane of first portion 240 of first piece 124 of structural support 120. Vertical wall 336 is positioned at least partially between upper flange 334 and lower flange 338, and extends in a direction perpendicular to upper flange 334 and lower flange 336. Upper flange 334 has a top surface 334*a*, at about the same level and parallel with plane A and a lower surface 334*b*, as the upper surface of the channel defined by horizontal C beam 114.

Vertical wall 336 is formed with a center hole 340 through its center. Center hole 340 can be round or have the polygon (square, hexagon, octagon, etc.) lock shape, configured to match key structure 940 of bolt 910. Connection flange 270 of structural support 120 is positioned substantially flat against vertical wall 336 of horizontal beam 114. The top surface of first piece 124 of structural support 120 is positioned just below lower surface 334*b* of upper flange 334. One of the holes through connection flange 270 is positioned to overlap center hole 340 with connection flange 270 in this position. With this configuration, because the width of horizontal beam 114 is three inches, the narrowest beam option of this non-limiting example, in order to fasten structural support 120 to horizontal beam 114, bolt 910 is inserted through central hole 340 and first hole 130 of structural support 120. First hole 130 is the closest to the top of connection flange 270. As seen in FIG. 3A, first hole 130 aligns with center hole 340 when connecting structural support 120 to the three inch horizontal beam 114. In this regard, first hole 130 is positioned such that structural support 120 fits snugly against vertical wall 336 of horizontal beam 114 and first piece 124 is positioned adjacent lower surface 334*b* of upper flange 334.

Figure 3C:
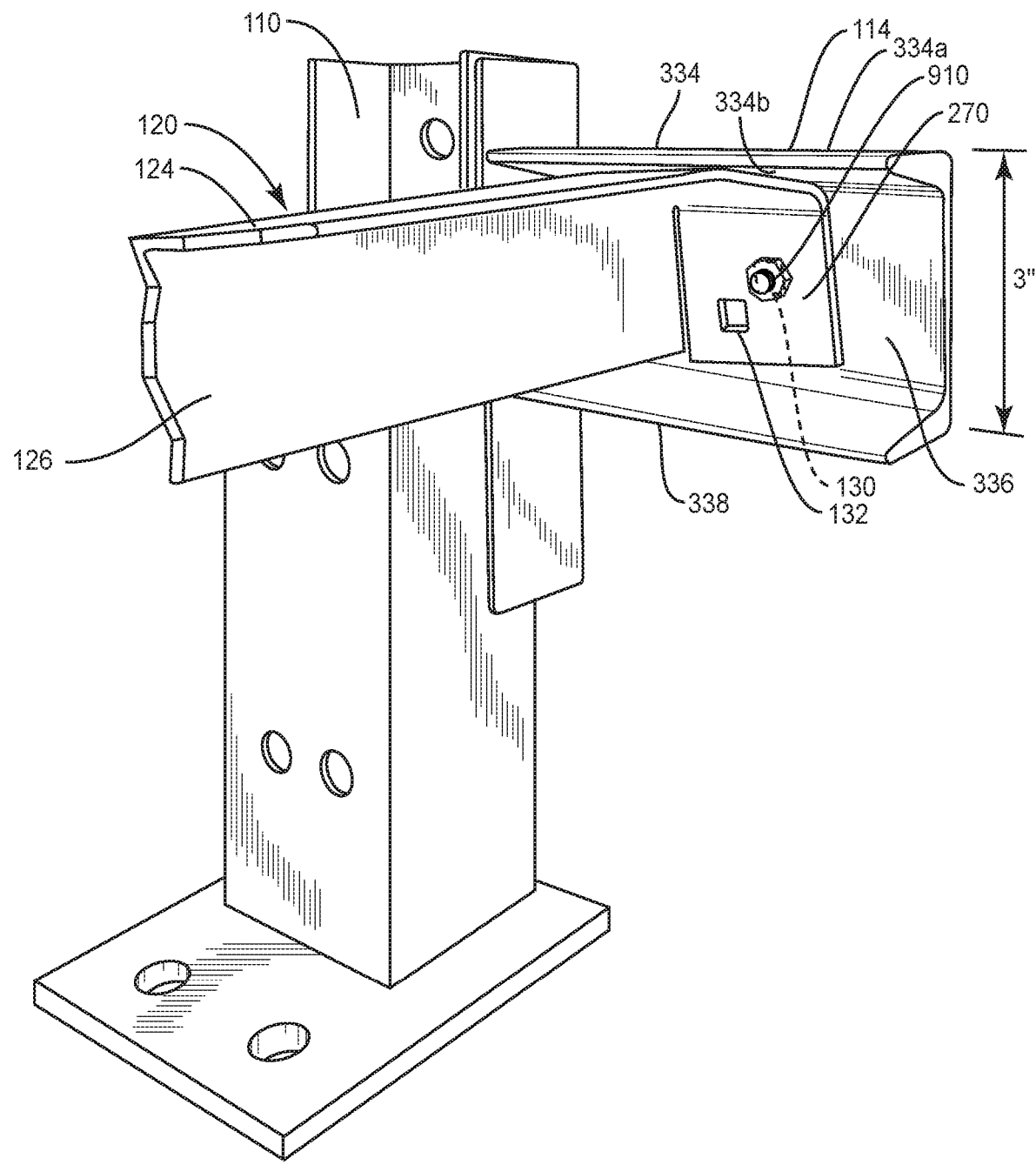
FIGS. 3C-D are perspective views of the structural support member rotating in opposite directions and features of the horizontal beam preventing a full rotation, in accordance with aspects of the present disclosure.
Figure 3D:
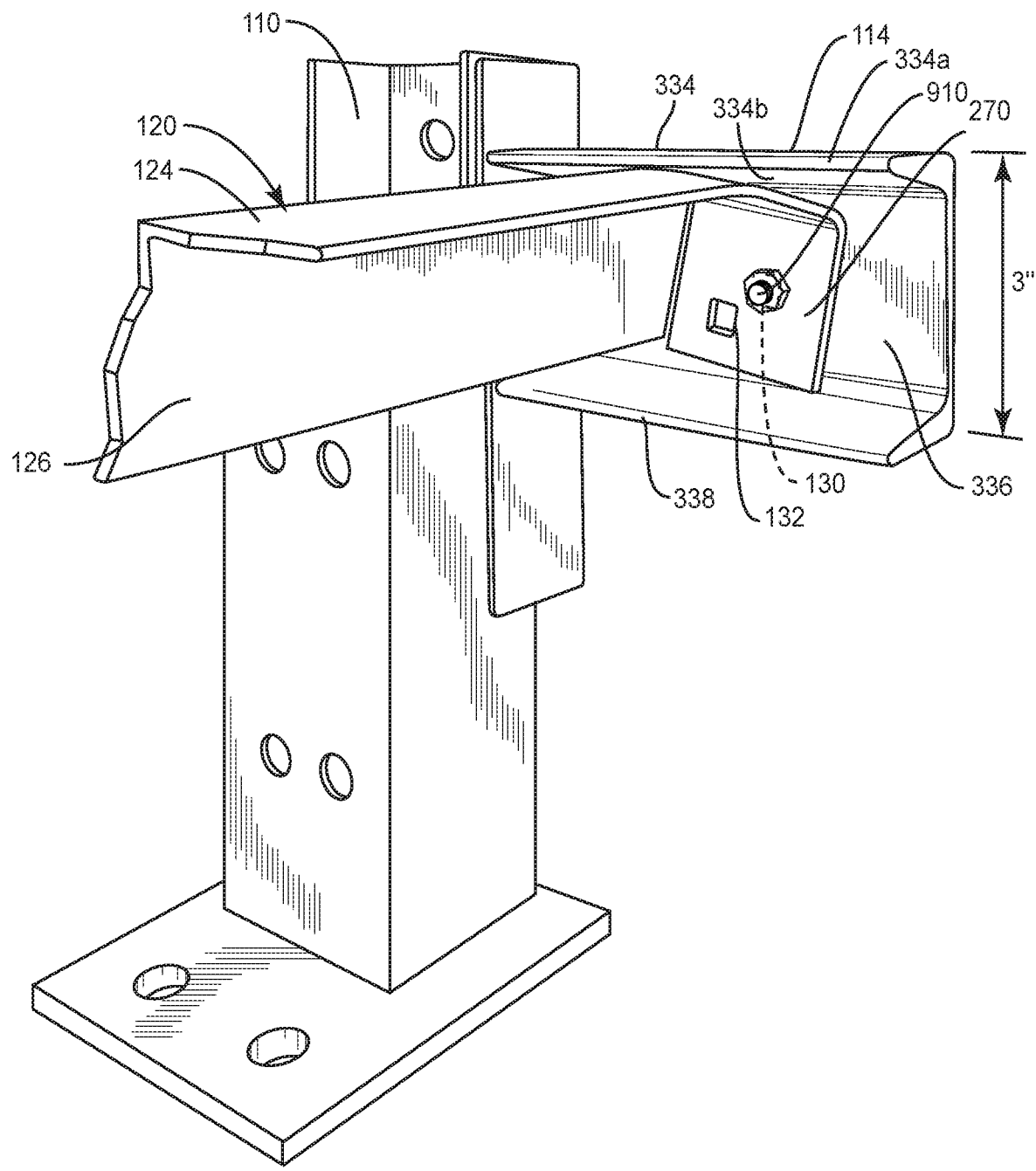

First piece 124 is positioned adjacent to upper flange 334 so that when force is exerted against structural support 120 that tends to twist structural support 120 with respect to central hole 340, the top surface of first piece 124 will come into contact with lower surface 334*b* of upper flange 334. Therefore, if the fastening mechanism that connects structural support 120 to horizontal beam 114 is not able to completely halt structural support 120 from spinning or rotating about bolt 910, then contact with upper flange 334 will prevent such rotation. Specifically, first piece 124 may be urged to rotate or deform, until a portion of first piece 124 comes into direct contact with upper flange 334. Furthermore, given the positioning of first hole 130 and center hole 340, structural support 120 is fastened to horizontal beam 114 in such a position that structural support 120 may come into contact with horizontal beam 114 in either rotational directions of structural support 120. For example, FIGS. 3C-D illustrate a portion of first piece 124 colliding with upper flange 334 in clockwise or counter clockwise rotational direction of structural support 120. Thus, in addition to structural support 120 being a universal connecting component, it can also serve as an anti-rotation device as well so that structural support 120 is always level. It has been determined that advantages in preventing rotation are achieved with the manufactured pieces, especially with the nut against connection flange 270, when first hole 130, which is the highest hole, for the smallest horizontal beam 114, should be the farthest of the holes through connection flange 270 from second piece 126 and hole 132, which is the lowest hole, for the largest horizontal beam 114, should be the closest of the holes through connection component 270 from second piece 126.

To further prevent such rotation, if both central hole 340 and first or second holes 130 or 132 have the same polygon shape as the cross section of key structure 940, key structure 940 will also prevent structural support 120 from twisting with respect to central hole 340 and bolt 910. When key structure 940 extends into both central hole 340 and hole 130 or 132, and all the holes are shaped to engage with key structure 940, then structural support 120, and bolt 940 provide resistance to rotation with respect to horizontal beam 114. Therefore, it is preferred that the size of key structure 940 is long enough in the longitudinal direction of bolt 940 to fit through the thickness of one of horizontal beam 114 or connection flange 270 and partially into the thickness of the other of horizontal beam 114 or connection flange 270. It is preferred that this length of key structure 940 is not longer than the combined thickness so that it does not prevent the tightening of the nut and necessitate the use of washers or special nuts and the like.

The horizontal beam and structural support should be formed of steel, having a thickness at least about 1/16 inch thick, preferably from about 1/16 to 3/16 inches, more preferably about 2/16 inches or at least 16 gauge, preferably 16 gauge to 7 gauge, preferably 14 gauge. In an embodiment wherein the key structure extends into a polygon shaped hole in the connection flange, it should extend at least 1/2 the thickness of the flange, preferably at least 3/4 the thickness of the flange, but preferably less than the 9/10 the thickness of the flange.

Figure 4A:
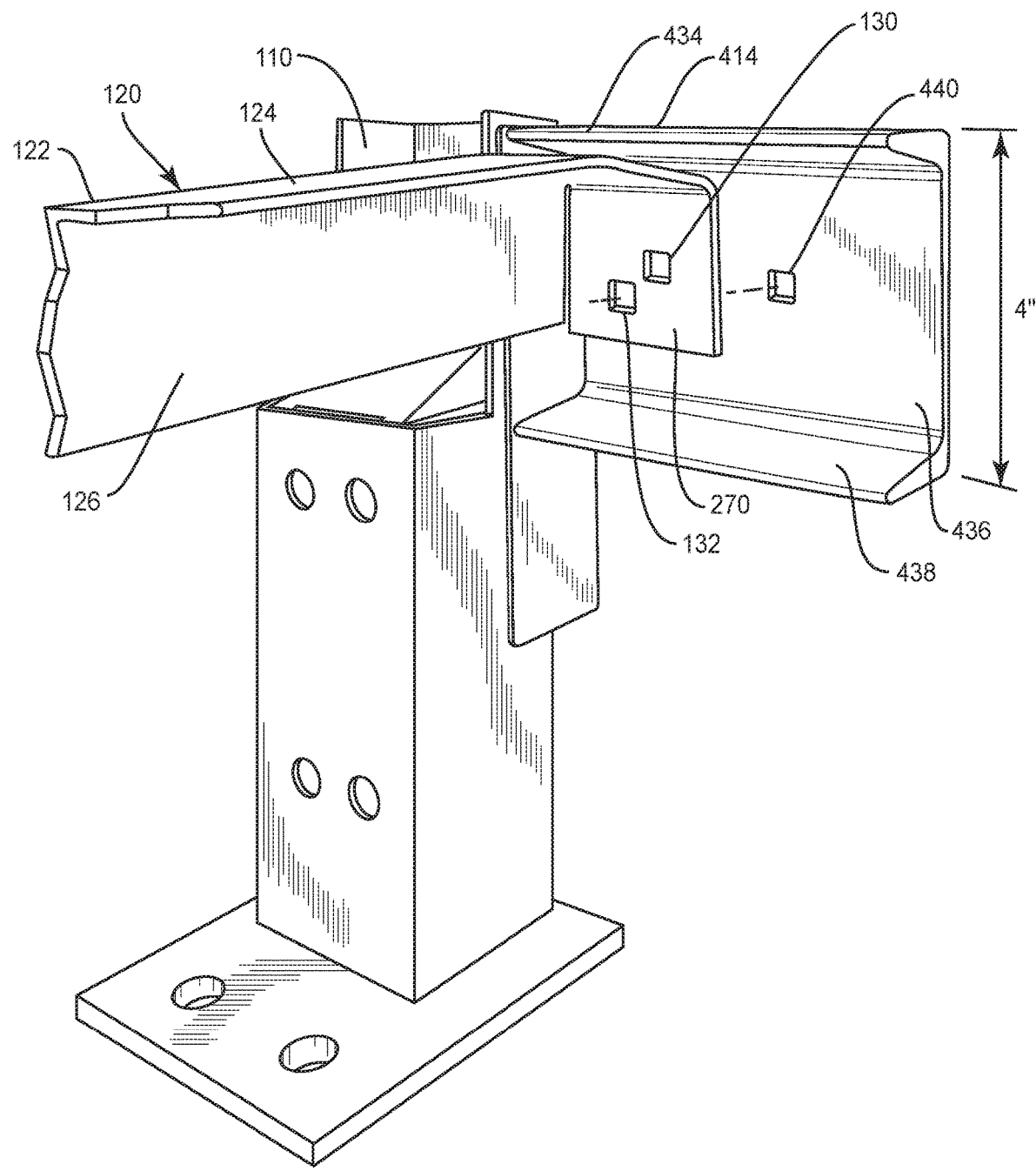
FIGS. 4A-B are perspective views of the structural support member connecting with a different horizontal beam, in accordance with aspects of the present disclosure.
Figure 4B:
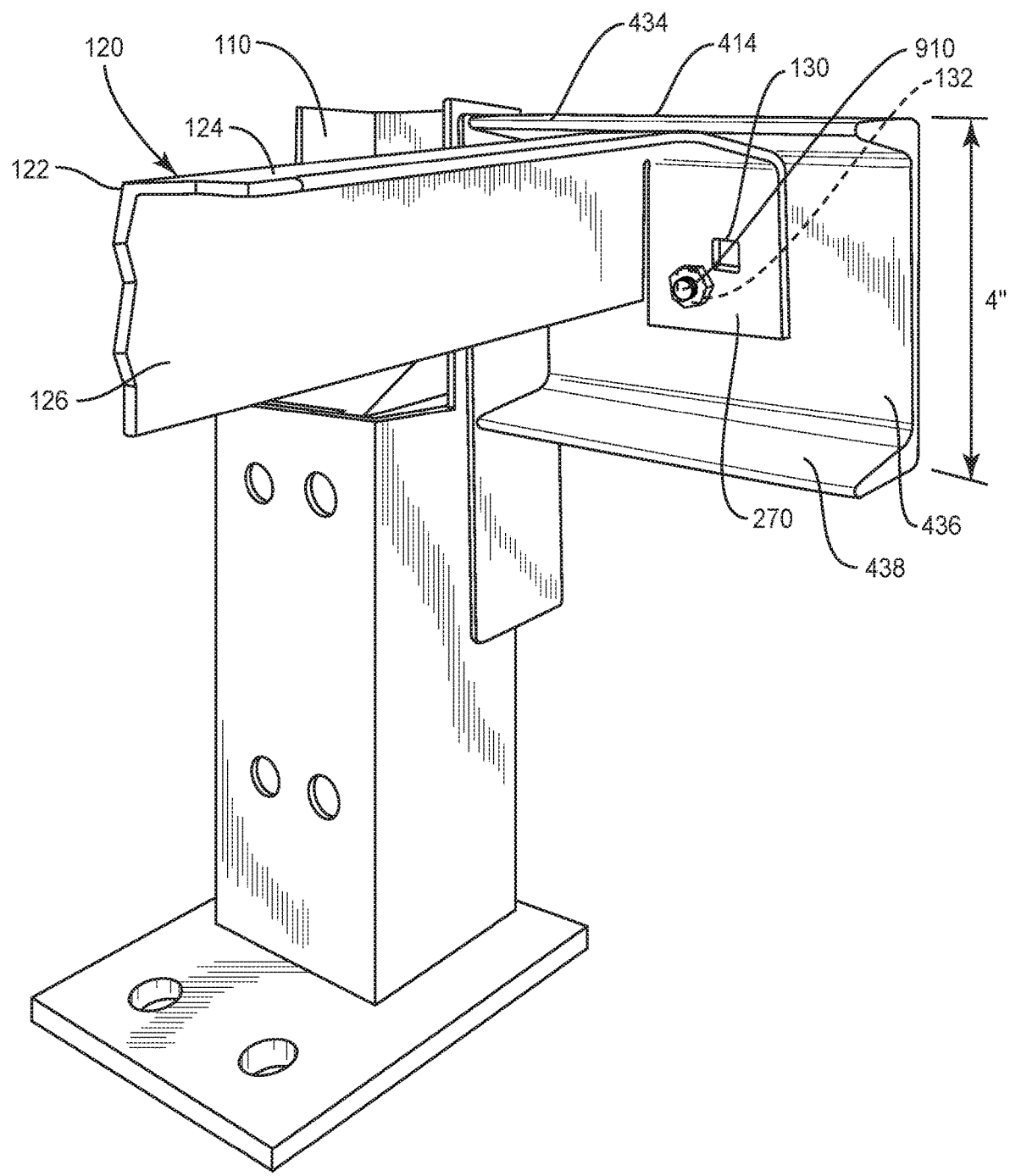

Furthermore, as illustrated in FIGS. 4A-B, structural member 120 is also able to securely mate with a four inch horizontal beam 414. Specifically, the width of horizontal beam 414 is four inches, that is, the length perpendicular to a longitudinal axis of horizontal beam 414 is about four inches. In this regard, structural member 120 has been configured such that it can be used with multiple sized horizontal beams, such as three-inch horizontal beam 114 and four-inch horizontal beam 414, as illustrated in FIGS. 3A-D and FIGS. 4A-B, respectively. As shown in FIGS. 4A-B, second hole 132 of structural member 120 aligns with a center hole 440 on four inch horizontal beam 414. Center hole 440 is about 2 inches from the top or bottom of beam 414. Furthermore, four inch horizontal beam 414 may be configured similarly to three inch horizontal beam 114 in that horizontal beam 414 includes an upper flange 434, vertical wall 436, and lower flange 438. Therefore, when structural member 120 is connected to horizontal beam 414, first piece 124 is positioned just below upper flange 434 and connection flange 270 is positioned flat against vertical wall 436.

Figure 5A:
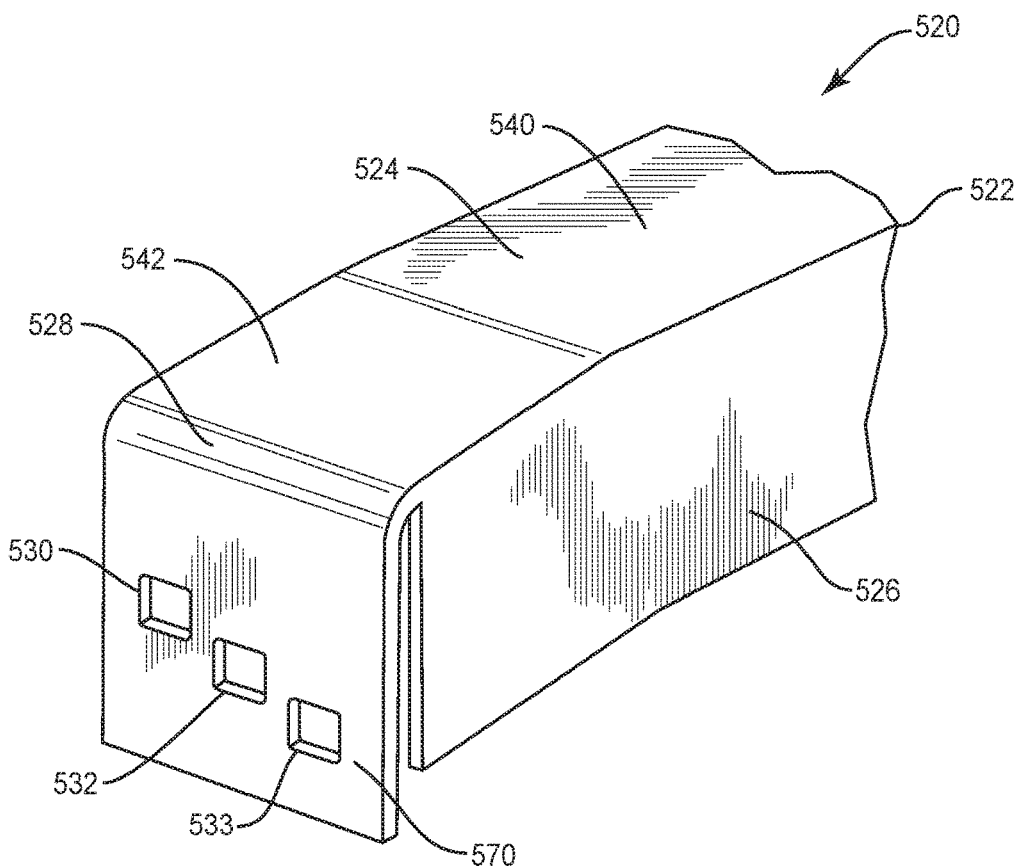
FIGS. 5A-B are perspective views of a second embodiment of a structural support member, having three bolt receiving holes, of the storage rack, in accordance with aspects of the present disclosure.
Figure 5B:
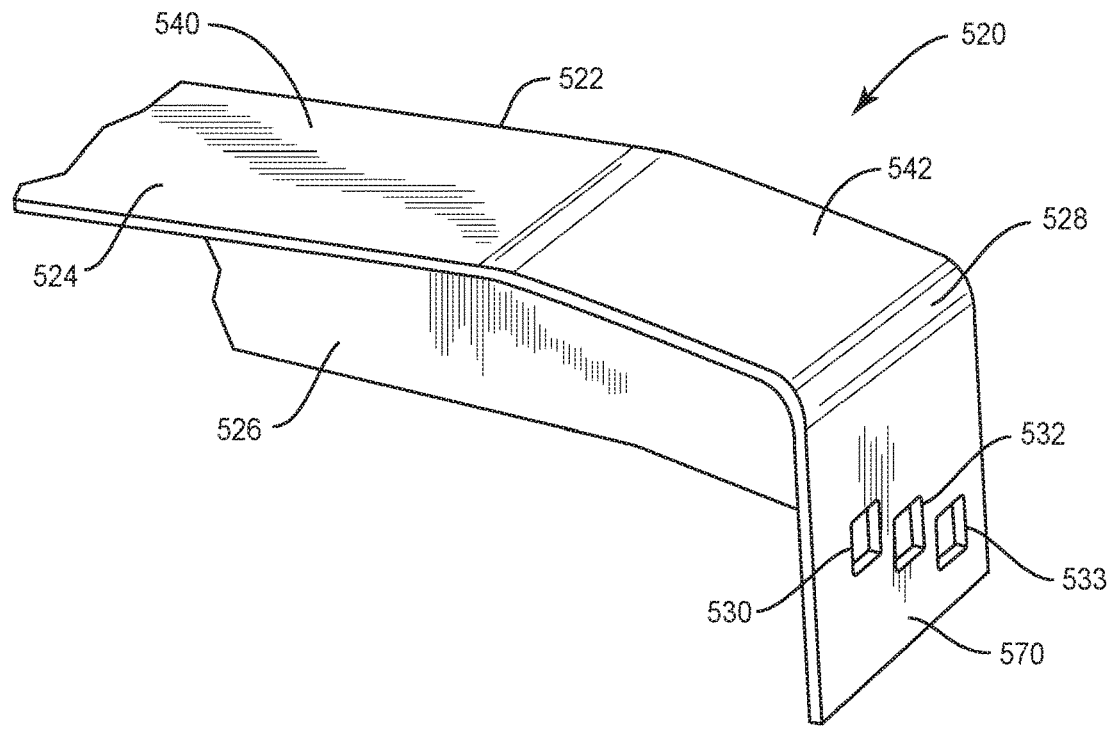

As an alternative embodiment, as illustrated in FIG. 5 a structural member 520 includes three holes through a connection flange 570. Connection flange 570 includes a first hole 530, a second hole 532, and a third hole 533, which are each off-centered on connection flange 570. Similar to the two holes through structural member 120, the three holes of connection flange 570 are off-centered and positioned in such a manner such that structural support 520 can be utilized with multiple sized widths of horizontal beams, namely a three-inch horizontal beam, a four-inch horizontal beam, and a three and a half inch horizontal beam having the center hole about 1.5, 2 or 1.75 inches from the top or bottom edge. Similarly, it has been determined that advantages in preventing rotation are achieved with the manufactured pieces, especially with the nut against connection component 570, when first hole 530, which is the highest hole, for the smallest horizontal beam 114, should be the farthest of the holes through connection component 570 from second piece 526 and third hole 533, which is the lowest hole, for the largest horizontal beam 114, should be the closest of the holes through connection component 570 from second piece 126.

Also, as with the prior embodiment, it is preferred to form the holes through the horizontal beam and the connection flange in a polygon shape, to receive key structure 940, and to prevent key structure 940 from rotating therein. For example, a properly sized and oriented triangle shaped key structure will fit inside a hexagon shaped hole, with its three points in three of the six corners of the hole, but will not rotate therein. Similarly, a properly sized and oriented rectangular key structure will fit into an octagonal hole, and will not rotate therein. However, it is preferred that the shapes of the holes substantially match the cross sectional shape of the key structure, within small tolerances.

Furthermore, similar to structural support member 120 discussed above, structural member 520 includes a central portion 522 that defines a first piece 524 and a second piece 526, which form an L-shape of central portion 522. First piece 524 includes a first end 528 and a second end (not shown) that is opposite first end 528 and configured similarly.

Additionally, a first portion 540 of first piece 524 forms a first plane. Adjacent to first end 528 is a second portion 542, which includes a slope that forms one or more planes at a different angle from the first plane. For example, instead of first piece 524 extending only along a first plane, second portion 542 is on a slope of a downward angle, similar to second portion 242 as discussed above with respect to structural member 120. For example, referring to FIGS. 6A-B, first piece 524 includes the slope downward from the first plane A so that connection flange 570 of structural member 520 is able to connect to a vertical wall 636 of 3 inch horizontal beam 614. Structural support 520 is placed within the open channel between an upper flange 634 and a lower flange 638 of horizontal beam 614 in order to fasten thereto. In this regard, if second portion 542 of first piece 524 did not include the slope thereon, then first piece 524 could contact upper flange 634 and interfere with connecting structural support 520 with horizontal beam 614 by colliding with upper flange 634.

Figure 6A:
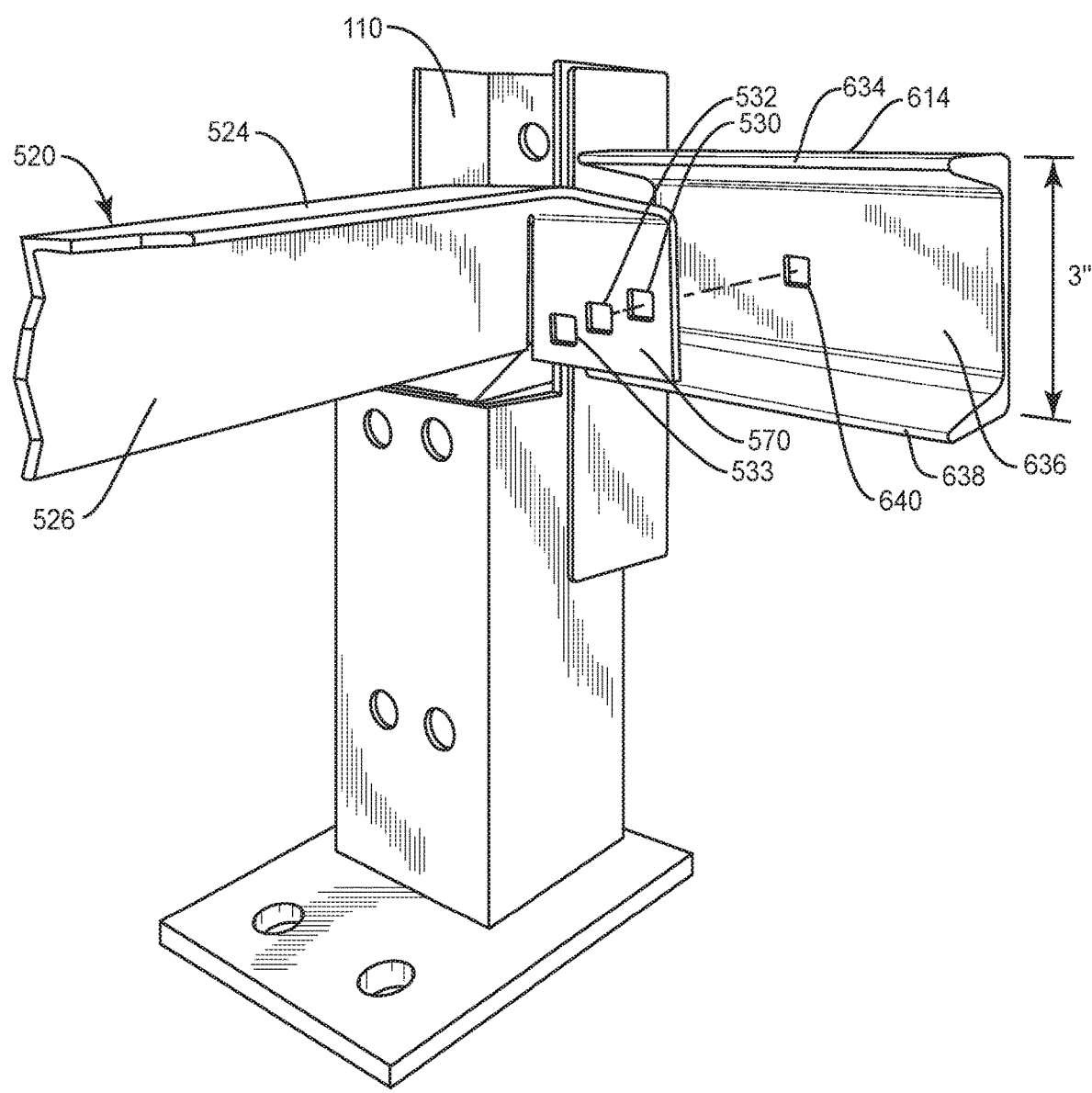
FIGS. 6A-B are perspective views of the three-hole structural support member connecting with a horizontal beam having a first size, in accordance with aspects of the present disclosure.
Figure 6B:
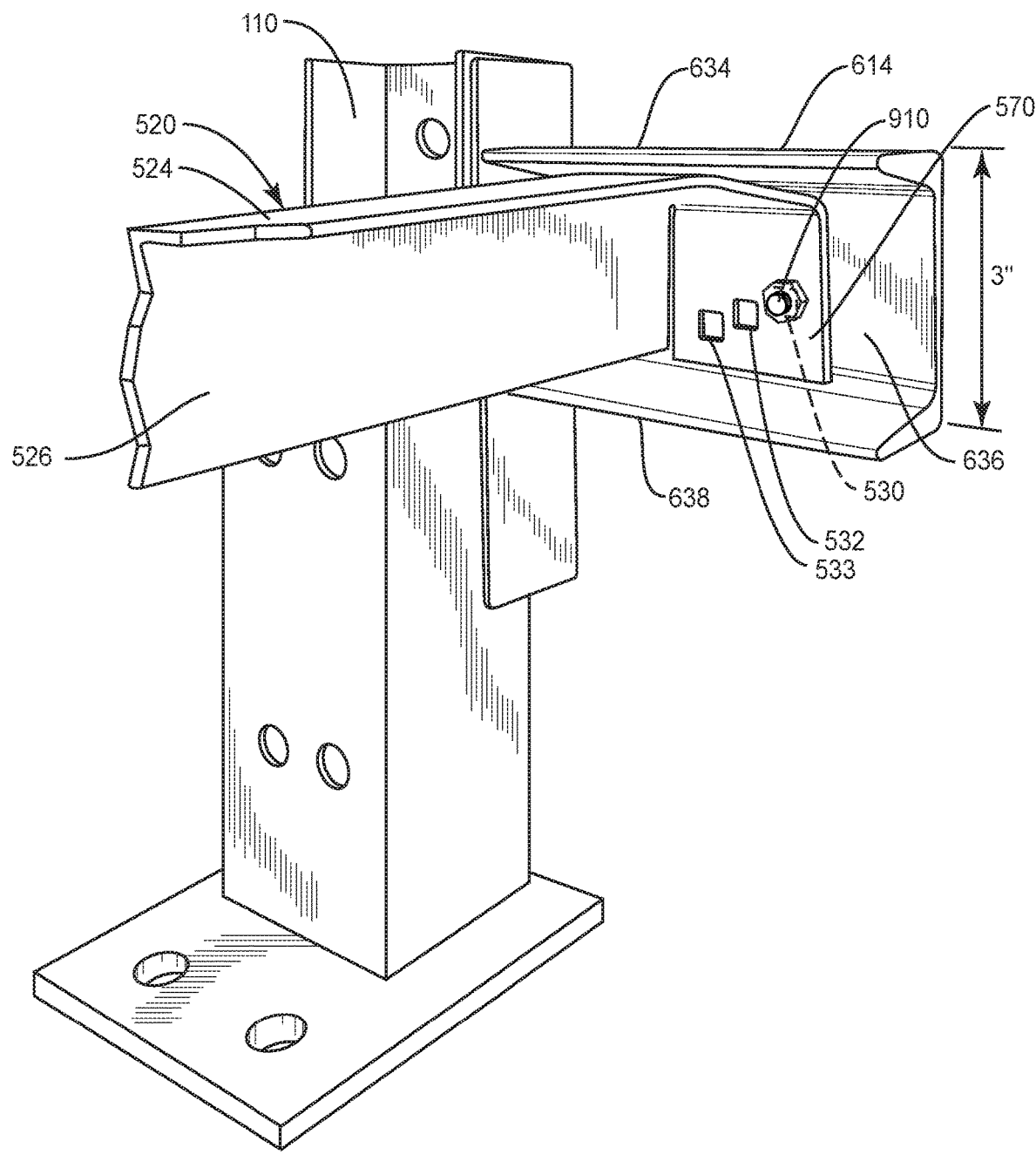

Referring to FIGS. 6A-B, first hole 530 of structural support 520 is aligned with center hole 640 of three-inch horizontal bar 614. When connected, first piece 524 of structural support 520 is adjacent to upper flange 634 and connection flange 570 is fastened to and adjacent to vertical wall 636.

Figure 7A:
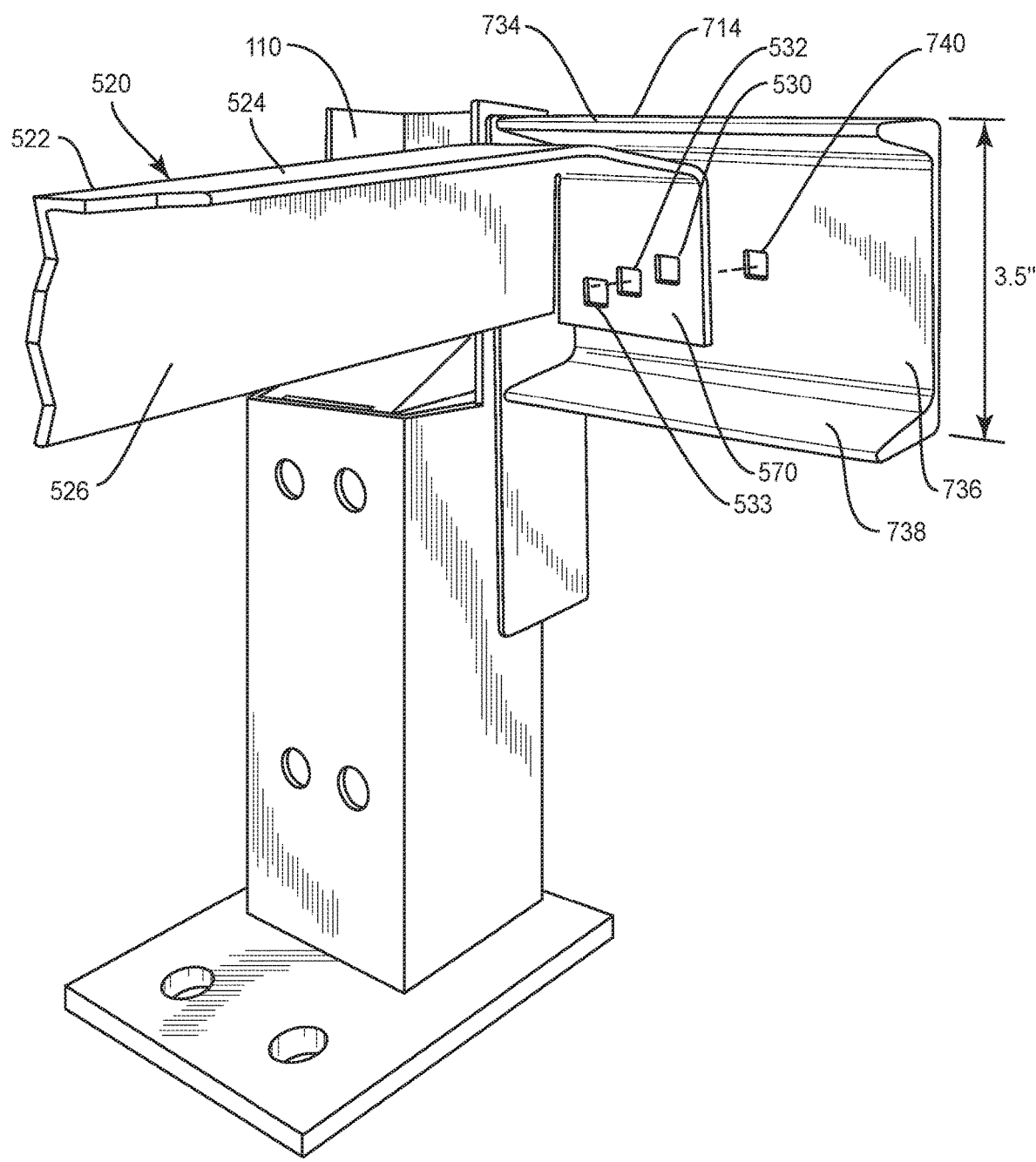
FIGS. 7A-B are perspective views of the three-hole structural support member connecting with a horizontal beam having a second size, in accordance with aspects of the present disclosure.
Figure 7B:
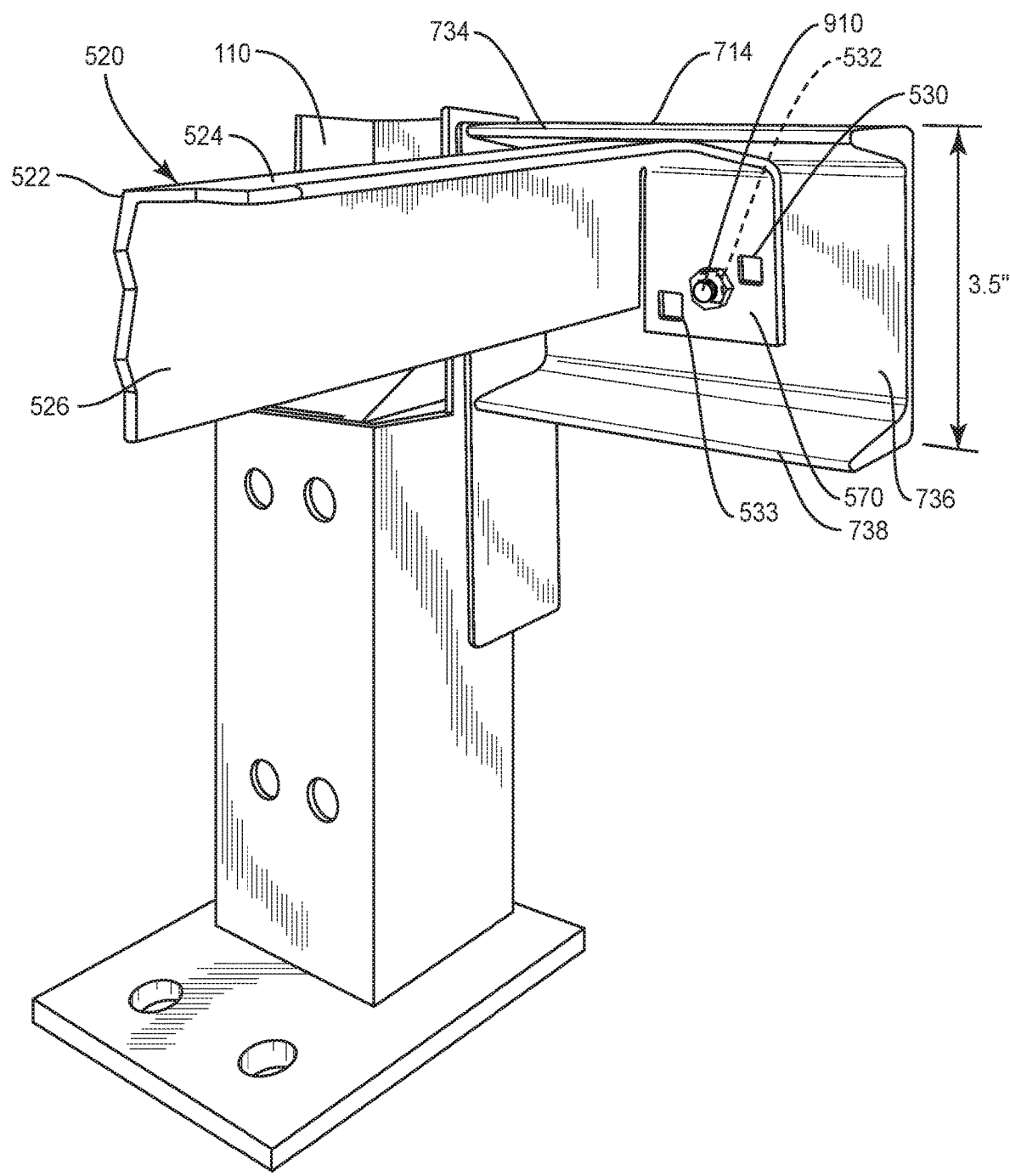

Referring to FIGS. 7A-B, which depicts a 3.5 inch horizontal beam 714, second hole 532 of structural support 520 is aligned with center hole 740 of 3.5 inch horizontal beam 714. Similar to other horizontal beams discussed herein, 3.5 inch horizontal beam 714 includes an upper flange 734, a vertical wall 736 and a lower flange 738. When structural support 520 is connected with horizontal bar 714, first piece 524 of structural support 520 is adjacent to upper plane 734 and connection component 570 is fastened to and adjacent to middle plane 736.

Figure 8A:
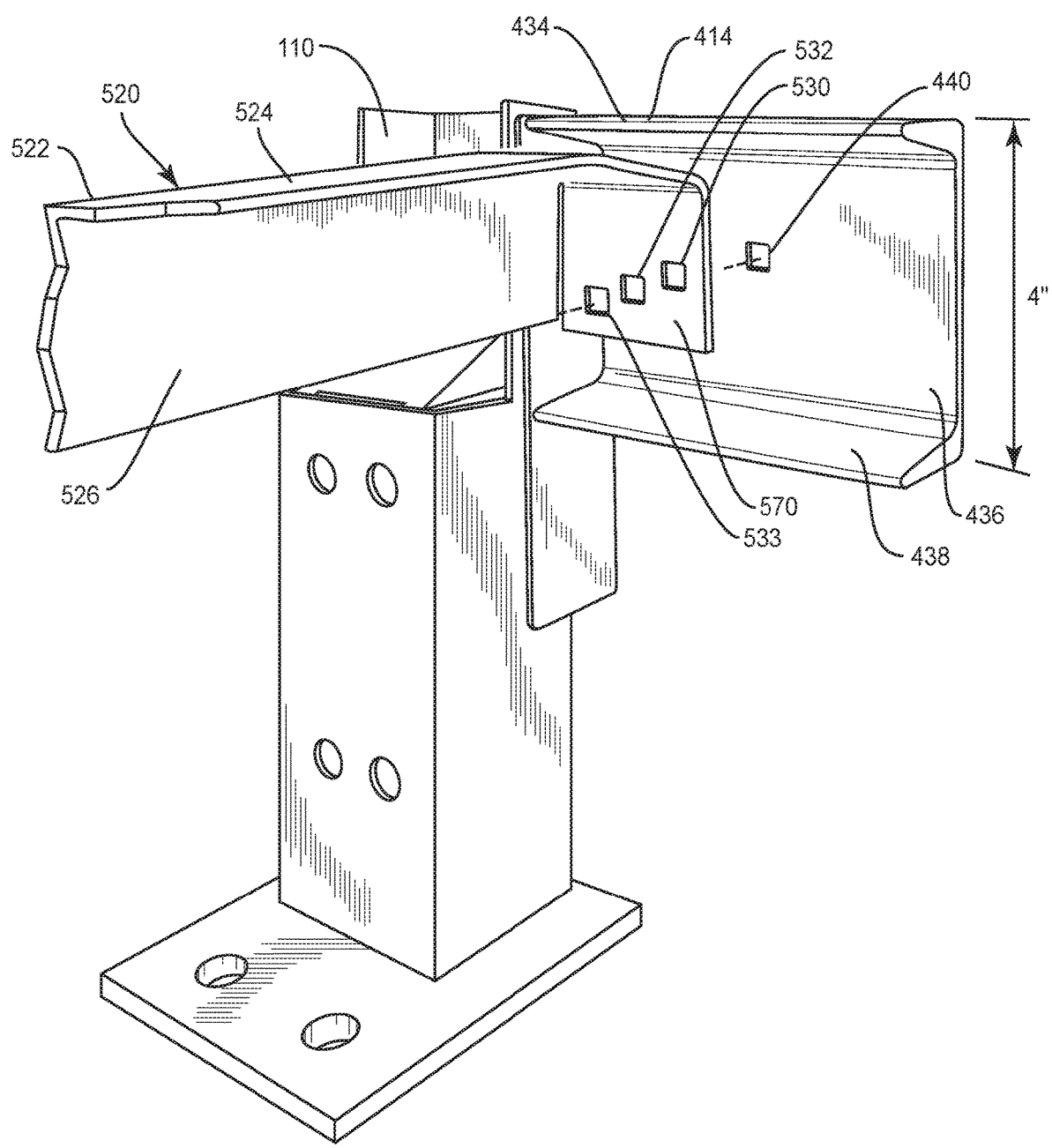
FIGS. 8A-B are perspective views of the three-hole structural support member connecting with a horizontal beam having a third size, in accordance with aspects of the present disclosure.
Figure 8B:
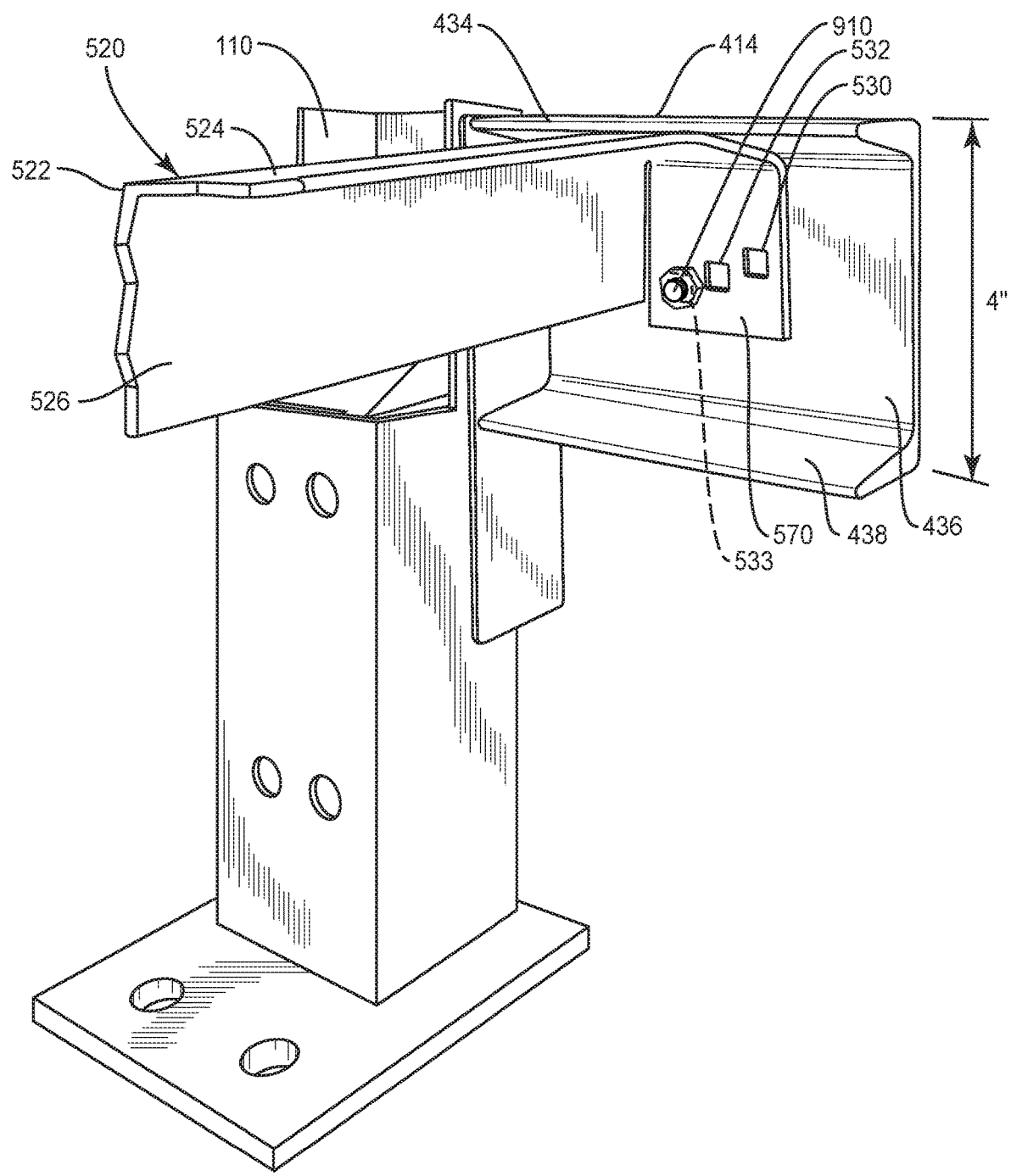

Referring to FIGS. 8A-B, third hole 533 of structural support 520 is aligned with center hole 440 of four inch horizontal beam. When structural support 520 is connected with horizontal beam 414, first piece 524 of structural support 520 is arranged just below upper flange 434 and connection flange 570 is fastened against vertical wall 436.

Structural support 520 serves similar advantages as structural support 120, and structural support 520 is adaptable for three different width sizes of horizontal bars or platforms. In addition to structural support 520 being a universal structural member by having the three holes on connection flange 570, structural support 520 also serves as an anti-rotation device so that structural support 520 is always level. Specifically, first piece 524 of structural support 520 may collide with the upper flange on the horizontal beams when structural support 520 begins to rotate. As a result, structural support 520 is always in at least a substantially level position. Also, because bolt 910 includes key structure 940, which locks into polygon shaped hole 540, rotation is likewise prevented.

The present disclosure is advantageous because the structural support member is universal in that a single structural support member may be manufactured and adaptable for multiple sizes of storage racks. In particular, storage racks that have horizontal beams that are three inches, four inches, or three and a half inches may be utilized. Thus, the ability to use the same structural support member for each sized storage rack provides for easier manufacturing, inventors control and predictability in terms of making the structural support member. Furthermore, the positioning of the structural support member with its top surface under an upper flange of the horizontal beam prevents the structural support from rotating in either direction. For example, the upper component, or first piece as discussed above, of the structural support acts as an anti-rotation component in that it collides with the upper flange of the horizontal beam, thereby prohibiting the structural support from rotating. Likewise, the use of a key/lock bolt and hole system prevents rotation. This increases the functionality of the storage rack overall in that the structural member will maintain its posture as a component within the storage rack, rather than rotating and causing slippage or other uneven storing of materials on the storage rack.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

The invention claimed is:

1. A storage rack system constructed to support pallets loaded with goods, comprising:
    a horizontal beam extending in a horizontal direction, the horizontal beam having a vertical wall extending in a vertical direction, a height in the vertical direction of about 3 inches or about 4 inches and a bolt receiving hole through the vertical wall;
    a structural support having a first end, a second end, and a supportive portion therebetween, the supportive portion having a first end portion, a second end portion and a central portion therebetween, the first end portion extending from the central portion to a connection end, and a connection flange extending in a downward direction from the connection end, the connection flange having a first and a second bolt receiving hole therethrough, each a different distance from a junction of the connection end of the first end portion to the connection flange, and the first hole through the connection flange overlaps the hole through the vertical wall when the vertical wall is 3 inches and the second hole through the connection flange overlaps the hole through the vertical wall when the vertical wall is 4 inches;
    a bolt attaching the structural support to the horizontal beam, the bolt having a threaded portion, a head portion, and a key structure between the threaded portion and the head portion, the bolt extending through the bolt receiving hole of the horizontal beam and the connection flange;
    the bolt receiving hole through the horizontal beam or the connection flange having a locking shape to engage the key structure and resist twisting of the bolt with respect to the locking shaped hole; and
    the key structure configured to interlock with the locking shaped bolt receiving hole through the connection flange or the horizontal beam and resist rotation of the bolt with respect to the connection flange or horizontal beam.

2. The storage rack system of claim 1, wherein the bolt receiving hole through both the vertical wall of the horizontal beam and the connection flange have the shape of a polygon and the key structure interlocks with the polygon shaped holes through the vertical wall and the connection flange and the key structure is adapted to resist rotation of the connection flange with respect to the vertical wall.

3. The storage rack system of claim 1, wherein the hole through the connection flange and the cross section of the key structure both have a square shape with substantially the same dimensions.

4. The storage rack system of claim 1, wherein:
    the vertical wall of the horizontal beam has a top flange at the top of the vertical wall, and the top flange has an upper surface and a lower surface;
    a top surface of the central portion of the supportive portion defines a first plane, a top surface of the first end portion slopes downward from the first plane, and the top surface of the first end portion is positioned at the lower surface of the top flange.

5. A storage rack system constructed to support pallets loaded with goods, comprising:
    a horizontal beam extending in a horizontal direction, the horizontal beam having a vertical wall extending in a vertical direction and a height in the vertical direction of about 3, about 3.5, or about 4 inches, and a bolt receiving hole through the vertical wall;
    a structural support having a central supportive portion having a first end portion and a second end portion, the first end portion extending to a connection end having a connection flange extending in a downward direction from the connection end, the connection flange having a first, a second, and a third bolt receiving hole therethrough, each a different distance from a junction of the connection end to the connection flange, and the first hole through the connection flange overlaps the hole through the vertical wall when the vertical wall is about 3 inches, the second hole overlaps the hole through the vertical wall when the vertical wall is about 3.5 inches, and the third hole overlaps the hole through the vertical wall when the vertical wall is about 4 inches in height;
    a bolt attaching the structural support to the horizontal beam, the bolt having a threaded portion, a head portion, and a key structure between the threaded portion and the head portion, the bolt extending through the holes through the horizontal beam and the connection flange;
    the hole through the horizontal beam or the connection flange having a locking shape to engage the key structure and resist twisting of the bolt with respect to the locking shaped hole; and
    the key structure configured to interlock with the locking shaped hole through the connection flange or the horizontal beam and resist rotation of the bolt with respect to the connection flange or horizontal beam.

6. The storage rack system of claim 5, wherein the first, second and third holes are arranged diagonally on the connection flange.

7. A storage rack system constructed to support pallets loaded with goods, comprising:
    a horizontal beam extending in a horizontal direction, the horizontal beam having a vertical wall extending in a vertical direction, and a bolt receiving hole through the vertical wall;
    a structural support having a supportive portion having a first end portion, a second end portion, and a central portion therebetween, the first end portion extending to a connection end, and a connection flange extending in a downward direction from the connection end, the connection flange having a bolt receiving hole therethrough;

a bolt attaching the structural support to the horizontal beam, the bolt having a threaded portion, a head portion, and a key structure between the threaded portion and the head portion, the bolt extending through the bolt receiving holes of the horizontal beam and the connection flange;

the bolt receiving hole through the horizontal beam or the connection flange having a locking shape to engage the key structure and resist twisting of the bolt with respect to the locking shaped hole;

the key structure configured to interlock with the locking shaped bolt receiving hole through the connection flange or the horizontal beam and resist rotation of the bolt with respect to the connection flange or horizontal beam;

wherein a top surface of the central portion of the supportive portion defines a first plane, the first end portion slopes downward from the first plane, and a top surface of the first end portion defines a second plane and a third plane, the second plane closer to the central portion than is the third plane and the second plane forms a larger angle downward from the first plane than the angle between the third plane and the first plane.

8. A structural support, comprising:
a first end portion, a second end portion, and a central portion therebetween, the central portion extending in a horizontal direction and having a top surface defining a first plane;
the first end portion extending from the central portion to a connection flange at a first end of the first end portion, the first end portion sloping downward from the first plane, wherein the first end of the first end portion is offset downward from the first plane;
the connection flange substantially perpendicular to the first plane and having a connection hole in the shape of a polygon therethrough; and
a top surface of the first end portion defines two sloping surfaces, each at a different angle with respect to the first plane.

9. The structural support of claim 8, wherein the connection hole is in the shape of a square.

10. The structural support of claim 8, wherein the connection hole is in the shape of a regular polygon and the connection flange is at least about ¹⁄₁₆ inch thick.

11. The structural support of claim 8, wherein there are at least two connection holes in the shape of a polygon through the connection flange, each a different distance from the first end of the first end portion.

12. The structural support of claim 8, wherein a first section of the first end portion, which is closest to the central portion, slopes downward from the first plane at an angle greater than an angle at which a second section of the first end portion, which is closest to the connection flange, slopes downward from the first plane.

13. A method of assembling a storage rack constructed to support pallets of goods, comprising:
attaching a structural support to a hole through a vertical wall of a horizontal beam oriented in a horizontal direction, the horizontal beam having an upper surface, a lower surface and the vertical wall from the lower surface to the upper surface, the horizontal beam having a height of about 3 to 4 inches;
the structural support having a connection flange with a thickness of at least about ¹⁄₁₆ inch and having a first and a second hole therethrough, overlapping the hole through the horizontal beam with the first hole when the beam has a height of 3 inches and overlapping the hole through the horizontal beam with the second hole when the beam has a height of 4 inches;
inserting a bolt through the hole in the vertical wall and the overlapping hole in the connection flange, the bolt having a threaded portion, a head portion, and a key structure between the threaded portion and the head portion;
the hole through the vertical wall or the connection flange having a polygon shape;
interlocking the key structure with the polygon shaped hole through the connection flange or vertical wall; and
tightening a nut over the bolt, the key structure preventing rotation of the bolt with respect to the connection flange or horizontal wall as the nut is tightened.

14. The method of claim 13, wherein the hole through the vertical wall and the connection flange are both in the shape of a polygon and interlocking the key structure with the hole through the vertical wall and the connection flange and the key structure preventing rotation of the support structure with respect to the horizontal beam.

15. The method of claim 13, wherein the connection flange extends downwards from a first end portion of the support structure and the first end portion slopes downward from a central portion of the support structure, the horizontal beam has an upper flange and the connection flange extends below the upper flange and a top surface of the support structure is positioned at a lower surface of the upper flange and prevents rotation of the support structure with respect to the hole through the connection flange when the support structure is urged into rotation with respect to the hole through the connection flange.

16. The method of claim 13, wherein the horizontal beam has a height of about 3.5 inches in the vertical direction, the connection flange has a third hole therethrough and the third hole overlaps the hole through the horizontal beam.

17. The method of claim 13, wherein the horizontal beam has a height of about 3, 3.5 or 4 inches in the vertical direction, the connection flange has multiple holes at different locations therethrough and the differently located holes are selectively used with the differently sized horizontal beams.

\* \* \* \* \*